Figure 1:
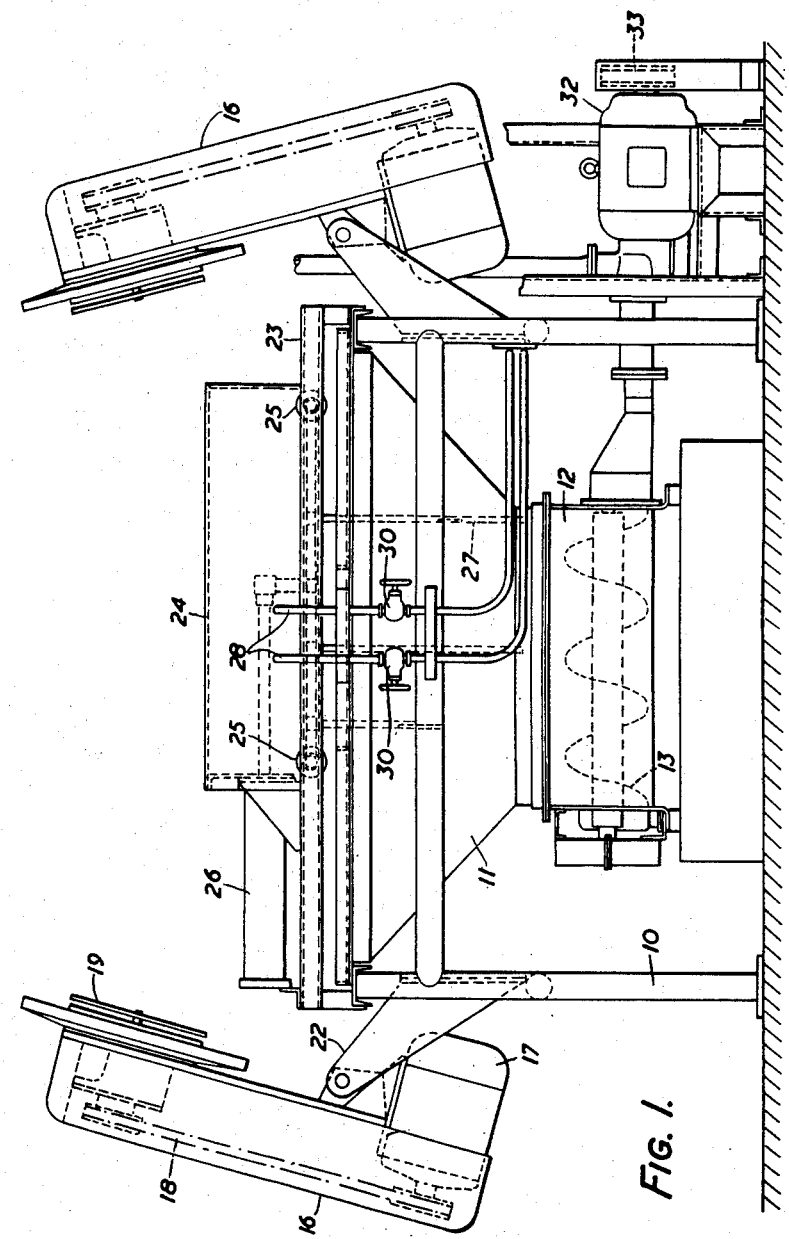

Dec. 18, 1962  L. GLUCKSTEIN ETAL  3,069,271
MANUFACTURE OF BEVERAGES AND THE LIKE
Filed May 27, 1960  4 Sheets-Sheet 1

Leonard Gluckstein
Reginald William Money
INVENTORS

BY
Pierre, Scheffler & Parker
ATTORNEYS

Dec. 18, 1962  L. GLUCKSTEIN ETAL  3,069,271
MANUFACTURE OF BEVERAGES AND THE LIKE
Filed May 27, 1960  4 Sheets-Sheet 2

INVENTORS
Leonard Gluckstein
Reginald William Money
BY
Pierce, Scheffler & Parker
ATTORNEYS Dec. 18, 1962   L. GLUCKSTEIN ETAL   3,069,271
MANUFACTURE OF BEVERAGES AND THE LIKE
Filed May 27, 1960                          4 Sheets-Sheet 3

Leonard Gluckstein
Reginald William Money
INVENTORS

BY
Pierce, Scheffler & Parker
ATTORNEYS

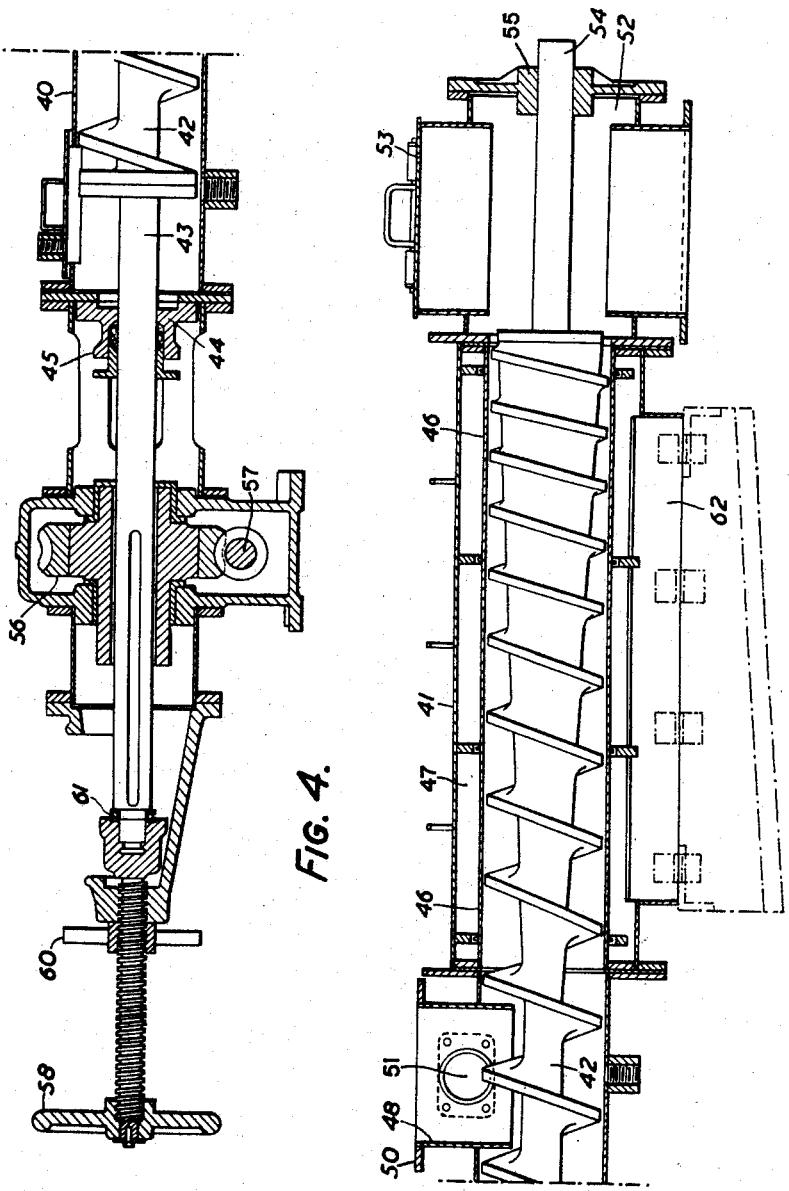

United States Patent Office 3,069,271
Patented Dec. 18, 1962

3,069,271
MANUFACTURE OF BEVERAGES AND THE LIKE
Leonard Gluckstein and Reginald William Money, London, England, assignors, by mesne assignments, to J. Lyons & Company Limited, London, England, a British company
Filed May 27, 1960, Ser. No. 32,297
Claims priority, application Great Britain Dec. 23, 1959
3 Claims. (Cl. 99—105)

This invention relates to the manufacture of beverages and the like from citrus fruits. Commercially, oranges are the most important citrus fruits, and lemons are also important; the invention will be described in relation to oranges and lemons, though it is not thereby to be inferred that the invention is limited thereto.

It is found in practice that the manufacture of citrus fruit beverages is a process which requires great care inasmuch as variations in the process can unexpectedly give rise to a product which is not acceptable either from the point of view of taste or of keeping qualities. In the past such considerations have militated against the continuous production of citrus fruit extract, suitable for beverages and the like. The present invention is concerned with a process which can be used continuously for this purpose, though batch working is not precluded.

A highly advantageous method of producing citrus base beverages and the like involves the comminution of whole fruit; immediately after comminution the fruit is immersed in a sugar syrup and after a period of time the solids are strained off from the liquid. The liquid product is then ready for bottling.

This process can be carried out to yield a very satisfactory product but care is necessary if the product is to retain its taste and appearance after storage. The reason for this is due very largely to the comminution of the peel; it is very desirable that the peel of the fruit should be used, as the oils in the peel add materially to the flavour of the product, but the use of the peel involves a danger of bitterness developing, especially after storage for some time. It will be appreciated also that the simplicity of comminution of the whole fruit is commercially desirable.

So far as we are aware it has never been found possible to carry out a process of this kind, involving comminution of whole fruit, in which the solids are separated from the liquids before the comminuted fruit is added to the main bulk of syrup. Any attempt to do do has always resulted in a product which either has bitterness at the time, or develops bitterness with keeping, or which deteriorates in appearance, or is lacking in flavour.

One of the limitations of the requirement that the comminuted fruit and syrup should be allowed to remain for a period of time is that the system must be operated as a batch system; in commerce continuous systems are much to be preferred. With the present invention a continuous process of manufacture can be adopted if desired.

The present invention consists of a process for the production of a citrus fruit product, which comprises comminuting whole fruit by means which rupture fruit sacs and oil cells, separating the liquids from the solids produced as a result of said comminution by means which produce gradually increasing pressures, free of high or pulsating pressures, and adding sugar syrup to the liquids obtained by said separation.

The invention also includes a process for the production of a citrus fruit product, which comprises comminuting whole fruit by means which rupture fruit sacs and oil cells, separating the liquids from the solids produced as a result of said comminution by a device comprising a screw feed member moving within a screen, the effective space between the screw feed member and the screen progressively decreasing along the length of the member, and thereafter adding sugar syrup to the liquids passing through said screen.

Figure 2:
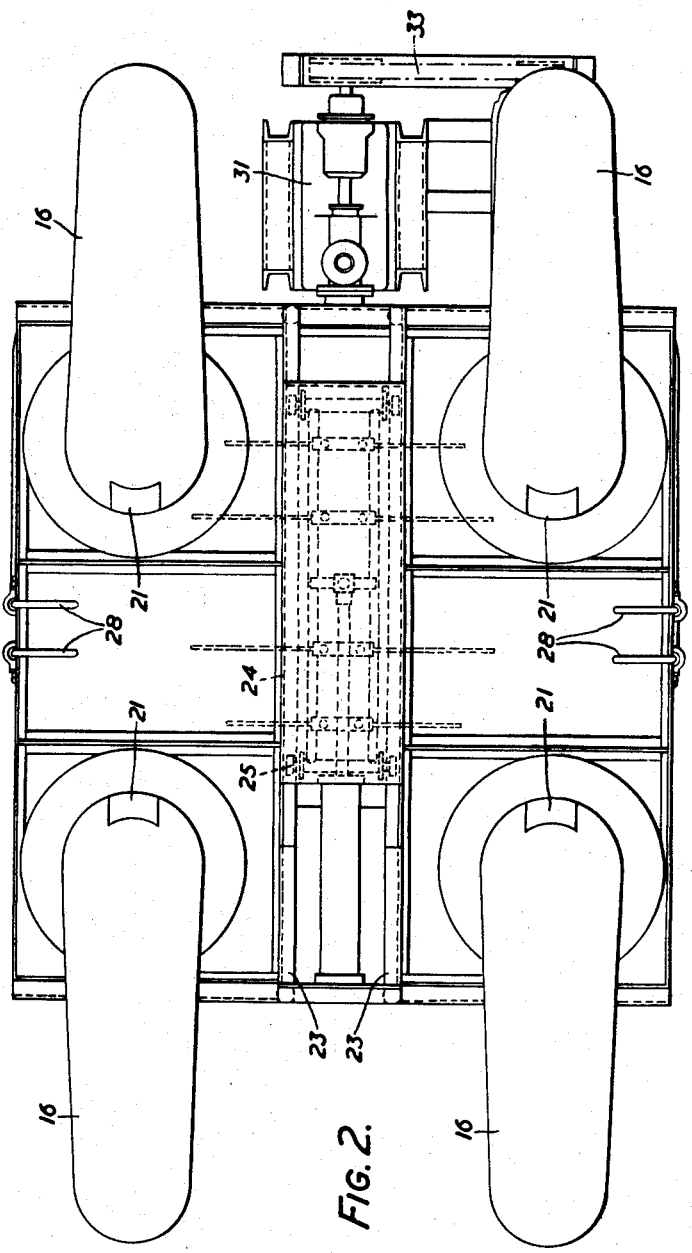
Figure 3:
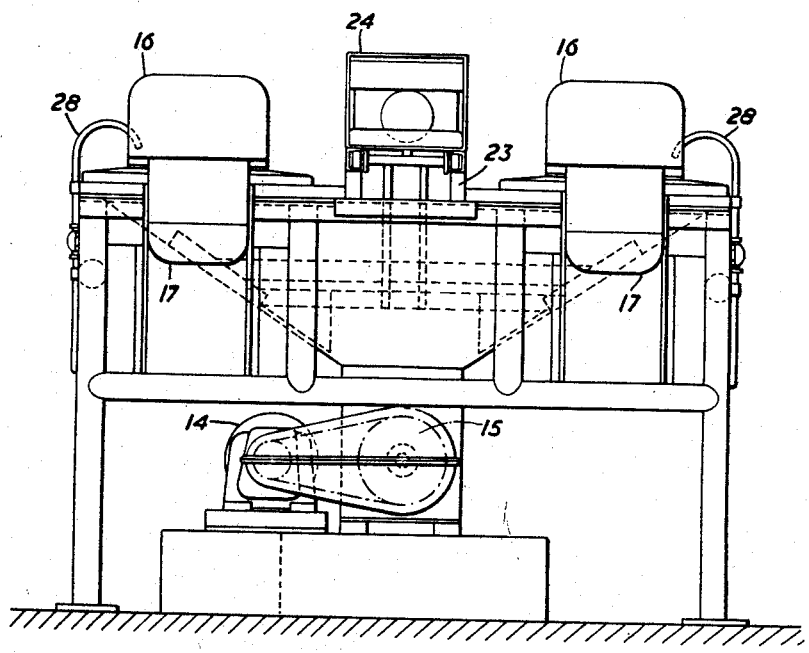

Other features and advantages of the invention will appear from the following description of embodiments thereof given by way of example, in conjunction with the accompanying drawings, in which:

FIGURE 1 is an elevation of a comminuting apparatus with the cutting heads in raised position;
FIGURE 2 is a plan view of the same apparatus but with the cutting heads in lowered position;
FIGURE 3 is an end elevation of the same apparatus; and
FIGURE 4 is a longitudinal section through a pressure separating apparatus which has been found suitable for use with the invention.

In one example of a process in accordance with the invention, oranges are first treated with steam or hot water; the object of this step of the process is two-fold: the skins of the oranges are sterilised, and the skins, but not the interior of the oranges, are heated. Water at about 170° F. can be used, to produce a surface temperature of the oranges in the region of 80° F. in the next stage of the process. The heating of the oranges in this way should not be unduly protracted; heating of the skin has the advantage of improving the subsequent extraction of the skin oils but excessive heat rise can lead to deterioration of both the skin and the fruit.

The fruit is comminuted, for which there can be used an apparatus comprising a rotating disc, to the upper surface of which the fruit can be fed, as described hereinafter; the disc carries knives which comminute the fruit, which is discharged from the underside of the disc. Alternatively, there can be used a hammer mill, the blades of which are sufficiently sharpened to produce a cutting action of the fruit. The mill is driven at high speed, and it can advantageously be operated so that the fruit is comminuted whilst immersed in a fluid, which can be the comminuted fruit, with the object of excluding air. There can be added before, during or shortly after comminution a proportion of sugar or sugar syrup.

The comminuted fruit is collected in a suitable container. This may be in the nature of a reservoir, but it can also be part of a continuous feed system, such as a flow pipe. In either case, it is desirable that comminuted fruit should be agitated, together with the incorporated sugar syrup, if any.

The next step in the process is to separate the solids from the liquid part of the product at this stage, and it is found that great care is necessary in this respect if an inferior final product is to be avoided. To secure a reasonably rapid and efficient separation of the solids which are principally waste, from the useful liquid, pressure is used, but the pressure must be applied in a gradual, progressive manner. A simple expression process in a bulk container has been found unsatisfactory, and the final product may have a bitter taste.

One method of producing the desired expression of liquid is by a pump comprising a cylindrical or tapering and perforated housing, with a central rotating feed screw. The pitch of the screw decreases towards the delivery end of the housing and in addition, or alternatively, the radial separation between the centre part of the screw and the housing may also decrease towards the same end. A device of this kind is also described hereinafter. It will be seen that such a device ensures a progressive compression of the material without localised areas of high pressure.

A centrifuge or hydro-extractor type of separator also has these desirable characteristics, and can be used for this purpose. A further suitable apparatus comprises a pair of facing conveyor belts, on the lower one of which the material is supported. The belts converge progressively to an extent sufficient to cause compression of the material.

It has already been indicated that it is an advantage to comminute the fruit out of contact with the air; this applies also to the compression process. The screw type device has, or can be arranged to have, this advantage without further provision, but in those cases where it is not it may be advantageous to operate the process with an atmosphere of carbon dioxide or nitrogen, or other inert or non-oxidising gas.

The test of the suitability of any arrangement is subjective, and is determined by the taste, keeping qualities and appearance of the final product. Once the liquid part of the fruit has been separated it can be stored for a short period, and is then aded to the bulk of the sugar syrup, in appropriate concentration.

Apparatus which can be used for carrying out this process is shown in the accompanying drawings, and includes a suitable comminuting apparatus, in FIGURES 1 to 3, and an expressing apparatus, in FIGURE 4.

The apparatus shown in FIGURES 1 to 3 is an embodiment of the invention forming the subject of a copending application Serial No. 32,296, filed May 27, 1960, in the name of William Tom Everington and assigned to the same assignee as is this application.

The comminuting apparatus shown in FIGURES 1 to 3 comprises a fabricated steel framework 10 which supports a tank 11 of approximately truncated pyramidal shape. The sides of the tank converge to a channel part 12 within which is located a feed screw 13 driven by an electric motor 14 by a belt drive 15.

Surmounting the tank are four cutter head units 16; these units are similar and each includes a frame at one end of which is an electric motor 17 driving through a belt drive 18 a cutter disc 19. Whole oranges are fed, through an opening 21, to the upper side of the disc; each disc has in it a series of knives which cut the whole fruit finely, the comminuted fruit falling by gravity from the under side of the disc into the tank beneath. Each cutter unit is pivotally mounted on one of a series of brackets 22, so that the units can be swung clear of the tank, as shown in FIGURE 1.

A reciprocating agitating means is mounted in the tank. Mounted on the top of the main frame 10 is a secondary frame 23; a carriage 24, fitted with rollers 25 can reciprocate on the secondary frame under the power of a double acting pneumatic cylinder 26. Below the carriage are supported agitating paddles 27 which accordingly reciprocate in the tank. Water can be fed into the tank, for cleaning, from water points 28, under the control of cocks 30.

The comminuted fruit is pumped from the lower part of the container, from the outlet end of the feed screw, by a pump 31, preferably of the "Mono" type, driven by a further electric motor 32, through belt drive 33. In addition to feeding the fruit from the container, this pump assists also in agitating the liquid.

From the pump 31, the fruit passes to apparatus for separating the solids from the liquids.

A suitable press for this purpose is shown in simplified form in FIGURE 4.

This includes two elongated coaxial cylindrical housings 40, 41, the latter being of slightly greater diameter than the former. Within the housings is mounted a feed screw 42; at its left hand end the screw is coupled to a shaft 43 carried in a bearing member 44 secured to the end of housing 40; a gland 45 is provided. The envelope of the feed screw 42 is cylindrical; fits, with a small clearance, in the inner diameter of housing 40; within housing 41 is a cylindrical perforated screen member 46 which closely surrounds the screw. There is a space 47 between the screen 46 and housing 41.

Housing 40 has an entry opening 48 for the comminuted fruit, the supply conduit for the fruit is coupled to flange 50. Sight glasses 51 are provided. At the end of screw 42 is a discharge opening 52, with an inspection cover 53. The feed screw shaft 54 is carried in a bearing 55 at this part.

The screw is driven by a worm and pinion drive comprising a worm wheel 56 on shaft 43 engaged by pinion 57. The shaft can be adjusted endwise by a hand wheel 58 and lock nut 60 on a threaded rod 61, the end of which bears through thrust race 61 against the end of the shaft.

The form of the feed screw 42 is important for the purpose of the invention; as will be seen from FIGURE 4, the diameter of the centre core of the screw increases progressively towards the right hand end, and the pitch of the turns of the screw decreases in the same direction. As a result of this design, the fruit and liquid admitted at 48 is fed to the right under gradually increasing pressure.

The liquid part of the comminuted fruit passes through the screens, and is drawn off from the space beneath the screen member 46 and indicated generally at 62. The solid part of the fruit is fed by the screw to the end of the screens and is discharged at 52.

The separation of liquids and solids in this way is effected without any sudden increases of pressure and without danger of very high pressures being attained. Moreover, the pressure on the material is sustained during the separation process.

The liquid drawn off at 62 is then incorporated with the appropriate quantity of sugar syrup, and any other ingredients as may be desired. It is preferred that the whole of the sugar syrup required should be added after separation of the liquid in press. The reason for this is that with the process described this can be done without adverse effect on the product, and in addition it reduces the volume of material to be separated in the press, and reduces losses of sugar syrup which would adhere to the solid parts of the comminuted fruit.

The reasons why the process of the present invention operates satisfactorily, contrary to expectation based on past experience are not clear, though it seems that it must be concerned primarily with the method adopted for the separation of the liquids and solids resulting from comminution of the fruit.

We claim:

1. A process for the production of a citrus fruit product, which comprises comminuting whole fruit by a cutting action by which fruit sacs and oil cells are ruptured, separating the liquids from the solids produced as a result of said comminution by subjecting said solids and liquids to gradually increasing pressures, free of high and pulsating pressures, and adding sugar syrup to the liquids obtained by said separation.

2. A process in accordance with claim 1, and including the step of heating said fruits, prior to comminution to raise the temperature of the skin of the fruits to about 80° F., the temperature rise of the inner part of the fruit being substantially less than that of the skin.

3. A process in accordance with claim 2, wherein said fruit is heated by water at about 170° F.

References Cited in the file of this patent

UNITED STATES PATENTS

| | | |
|---|---|---|
| 2,322,791 | De Back | June 29, 1943 |
| 2,540,345 | Pipkin | Feb. 6, 1951 |
| 2,818,342 | Ransom | Dec. 31, 1957 |
| 2,859,118 | Lewis | Nov. 4, 1958 |
| 2,930,314 | Carlson | Mar. 29, 1960 |